(12) United States Patent
Dulay et al.

(10) Patent No.: US 7,454,828 B2
(45) Date of Patent: Nov. 25, 2008

(54) METHOD FOR MANUFACTURING A MAGNETIC WRITE HEAD

(75) Inventors: Sukhbir Singh Dulay, San Jose, CA (US); Justin Jia-Jen Hwu, San Jose, CA (US); Thao John Pham, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 435 days.

(21) Appl. No.: 11/286,076

(22) Filed: Nov. 23, 2005

(65) Prior Publication Data

US 2007/0113395 A1 May 24, 2007

(51) Int. Cl.
*G11B 5/127* (2006.01)
*H04R 31/00* (2006.01)

(52) U.S. Cl. .............. 29/603.16; 29/603.13; 29/603.15; 29/603.18; 216/62; 216/65; 216/66; 204/192.34; 360/122; 360/317; 451/5; 451/41

(58) Field of Classification Search . 29/603.13–603.16, 29/603.18; 216/65; 204/192.34; 360/122, 360/317; 451/5, 41
See application file for complete search history.

(56) References Cited

U.S. PATENT DOCUMENTS

| | | | |
|---|---|---|---|
| 5,995,343 A | 11/1999 | Imamura | 360/126 |
| 6,521,902 B1 | 2/2003 | Chang et al. | 250/492.21 |
| 6,651,313 B1 | 11/2003 | Chang et al. | 29/603.15 |
| 7,002,775 B2 * | 2/2006 | Hsu et al. | 360/125.03 |
| 2005/0218324 A1 | 10/2005 | Street | 250/309 |
| 2006/0143900 A1 * | 7/2006 | Peterson et al. | 29/603.12 |

* cited by examiner

*Primary Examiner*—Paul D Kim
(74) *Attorney, Agent, or Firm*—Zilka-Kotab, PC

(57) ABSTRACT

A method for measuring recession in a wafer undergoing an asymmetrical ion mill process. The method includes the formation of first and second reference features and possibly a dummy feature. The reference features are constructed such that the location of the midpoint between them is unaffected by the asymmetrical ion mill. By measuring the distance between a portion of the dummy feature and the midpoint between the reference features, the amount of recession of the dummy feature can be measured. The measurement can be used to calculate the relative location of the flare to the read sensor rear edge through overlay information. By keeping the angles of the sides of the features steep (ie. nearly parallel with the direction in which the ion mill is asymmetrical) the amount of material consumed on each of the reference features is substantially equal and the midpoint between the reference features is substantially stationary.

25 Claims, 9 Drawing Sheets

METHOD FOR MANUFACTURING A MAGNETIC WRITE HEAD

FIELD OF THE INVENTION

The present invention relates to the process control aspect of the manufacture of thin film magnetic heads and more particularly to a metrology methodology for determining a flare point location and referencing it to a previously built read sensor layer during manufacture of a magnetic write element.

BACKGROUND OF THE INVENTION

One of the most important components of a computer is the magnetic disk drive. The hard drive includes magnetic disks and sliders where the magnetic head assembly including write and read heads are mounted, the suspension arms accommodating them, and an actuator arm, and the related controlling circuitry. When the magnetic disks rotate, air adjacent to the disk surface moves with them. This allows the sliders, i.e., the individual magnetic heads, to fly on an extremely thin cushion layer of air, generally referred to as an air bearing. When the slider flies on the air bearing, the actuator arm swings the suspension arm to place the magnetic head assembly over selected circular tracks on the rotating magnetic disk where signal fields are written and read by the write and read heads respectively. The write and read heads are connected to signal processing circuitry that operates according to a computer program to implement write and read functions.

As areal data density requirements push manufactures to produce ever smaller read and write heads, the need to control manufacturing with tighter tolerances increases dramatically. This is particularly true when the perpendicular recording design is introduced for magnetic disk drive production for the next generation high areal density data storage (>130 Gbit/in$^2$) requirements. In a finished head, the distance of flare location of the write pole to the air bearing surface (ABS) is very important since it determines the performance of the write head. Unfortunately this parameter cannot be clearly defined at the wafer level since the air bearing surface has not yet been defined. The ABS is formed when the head build is finished and heads are sliced off from the wafer and after mechanical lapping. The mechanical lapping exposes both the read sensor at ABS and the distance of the write pole flare to ABS is then defined. Since the lapping process uses the location of the read sensor as a reference, the write pole flare location to ABS can be predicted as long as the flare can be referenced to the location of the read sensor during the wafer process, which is far upstream from the finished sliders. In modern manufacturing metrology, the rear edge of the read sensor is commonly used as a reference point since it remains in the finished head after lapping. Therefore, it is highly desirable for a metrology solution to identify the write pole flare location referenced to read sensor for performing write head flare feedback and process control at an early stage of the head build. This enables the performance prediction of the heads at an earlier stage before they are finished from the build.

The entire magnetic head is built through layers of thin films through deposition, photolithography, ion milling, plating steps, etc on the ceramic composite wafers. During the write head process for perpendicular recording, a write pole of a write head has a narrow, constant cross section that extends to a desired distance from the ABS by design. By design, at a desired distance from the ABS the write pole flares laterally outward. The point at which this flare initiates is called the flare point, and the location of the flare point is important to proper write head performance.

Unfortunately, the location of the flare point during manufacture is not stationary. It is susceptible to process variations, and it may move along the pole axis direction after certain process steps. For example, during an ion milling operation used to trim and form the write pole profile, the location of the flare point is affected and thus moved. While the distance from the flare location to ABS needs to be identified, the method to identify this distance during the wafer level is the key to accurately predict the final location of the flare point at head level.

Therefore, there is a strong felt need for a manufacturing method for accurately determining and controlling the flare point location during the manufacture of a write pole. Such a method would identify the write pole flare location using the read sensor rear edge as a reference. Such a method would preferably not incur significant additional cost or manufacturing complexity and would preferably be capable of being incorporated into existing manufacturing processes.

SUMMARY OF THE INVENTION

The present invention provides a method for determining the location of the flare point of the writer pole using the rear edge of the read sensor as the reference on the wafer level after an asymmetrical ion mill. A pair of reference features are formed on the wafer, and the distance between them is used as the reference location for the definition of the flare. Since this feature pair is designed together with the write pole on the same mask, the location of the flare point, once identified, is then identified again with respect to the rear edge of the reader sensor through overlay metrology measurement.

The present invention can be useful in determining the location of flare when an asymmetrical ion mill to used to process a write pole of a perpendicular recording design. It is a common metrology practice that a change of the location of a feature is measured against another feature whose location is considered stationary on a same layer during a process. Usually a reference feature design, such as a round, a rectangle, a square, or a cross is put down on the same mask during build so the reference feature and the location of interest nearby are processed in the same condition. The geometrical center of the reference is commonly used as the reference location to gauge the positional change of the point of interest. However, because of the asymmetrical ion mill sweep used to form the reversed trapezoidal cross sectional profile of the perpendicular writer pole profile, the reference features will be milled asymmetrically in the direction where the positional measurement is needed, in this case in the direction of write pole axis. As a result of this, the geometrical center of these features will no longer be "stationary" and thus cannot be served as a coordination reference point. In this invention, we configure the reference features so that the midpoint between them does not "change" or "move" during the asymmetrical ion mill. The location of the write pole flare point can be measured with this reference after the ion mill step, then the final flare location with respect to the rear edge of the read sensor can be calculated through the overlay information obtained by a conventional overlay measurement between the write and read layers.

The reference feature pair can be configured as narrow line features. For example, if the ion mill process mills the pole to have mirror symmetry about the y axis only, the reference feature pair can be configured in a way that the dimension in y is much larger than that in x. During ion mill, the edges parallel to the y direction receive equal amount time of milling, because the edge dimension in x is comparatively small, the tips of the features will erode in the same amount so that the center location of the tips will not change after mill.

The reference feature pair can be configured as triangles with small apex angles to mimic the line features stated above, such as isosceles triangles each having an apex that faces the other reference feature. The triangular reference features can each have first and second sides define an angle that is less than or equal to 10 degrees with respect to the y axis. More preferably, the triangular features define an angle of less than 5 degrees with respect to the y axis. Because the ion mill has its mirror symmetry about the y axis, with the steep apex angle, the amount of material removed by the asymmetrical component of the ion mill will be equal on both sides and the triangular features will recess in equal and opposite directions such that the midpoint between the two apex locations remains unchanged during and after mill.

The measurement of the distance between the flare point in the write pole feature and the midpoint between the first and second reference features can be performed at least partially simultaneously with said sweeping ion mill. The ion milling can be terminated when the distance between the flare point in the dummy write pole feature and the midpoint between the first and second reference features reaches a predetermined value.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

BEST MODE FOR CARRYING OUT THE INVENTION

The following description is the best embodiment presently contemplated for carrying out this invention. This description is made for the purpose of illustrating the general principles of this invention and is not meant to limit the inventive concepts claimed herein.

Figure 1:
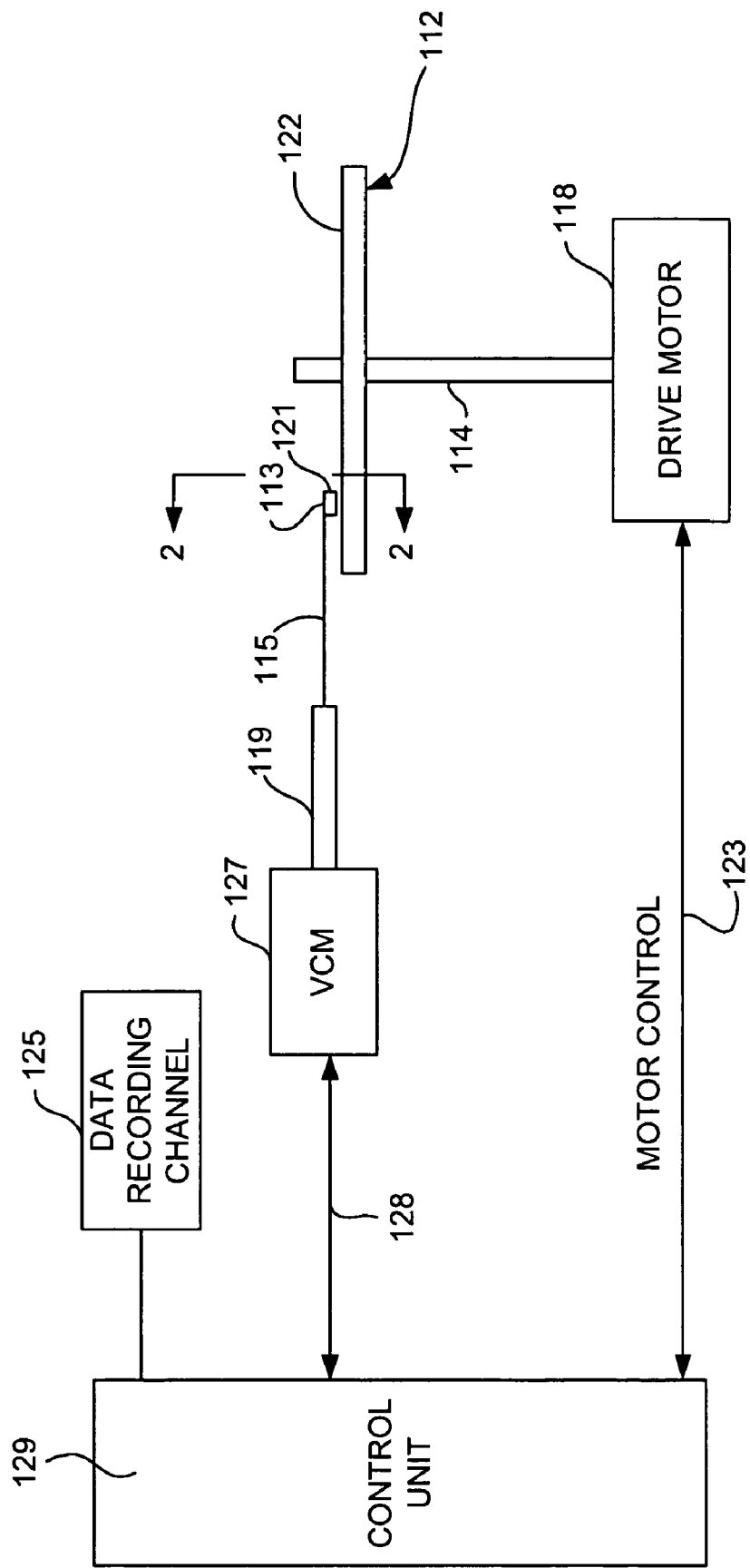
FIG. 1 is a schematic view of a magnetic storage system in which the present invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of an annular pattern of concentric data tracks (not shown) on the magnetic disk 112.

At least one slider 121 is positioned near the magnetic disk 112, each head gimble assembly 113 supporting one or more magnetic heads 121. As the magnetic disk rotates, the head gimble assembly 113 swings in and out over the disk surface 122 so that the magnetic head 121 may access different tracks of the magnetic disk where desired data are written. Each slider 121 is attached to an actuator arm 119 by way of a suspension 115. The suspension 115 provides a slight spring force which biases slider 121 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 121 and the disk surface 122 which exerts an upward force or lift on the slider. The air bearing thus counter-balances the slight spring force of suspension 115 and supports the slider 121 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

The above description of a typical magnetic disk storage system and the accompanying illustration of FIG. 1 are for representation purposes only. It should be apparent that disk storage systems may contain a stack of disks and actuators, and each actuator may support a number of sliders.

Figure 2:
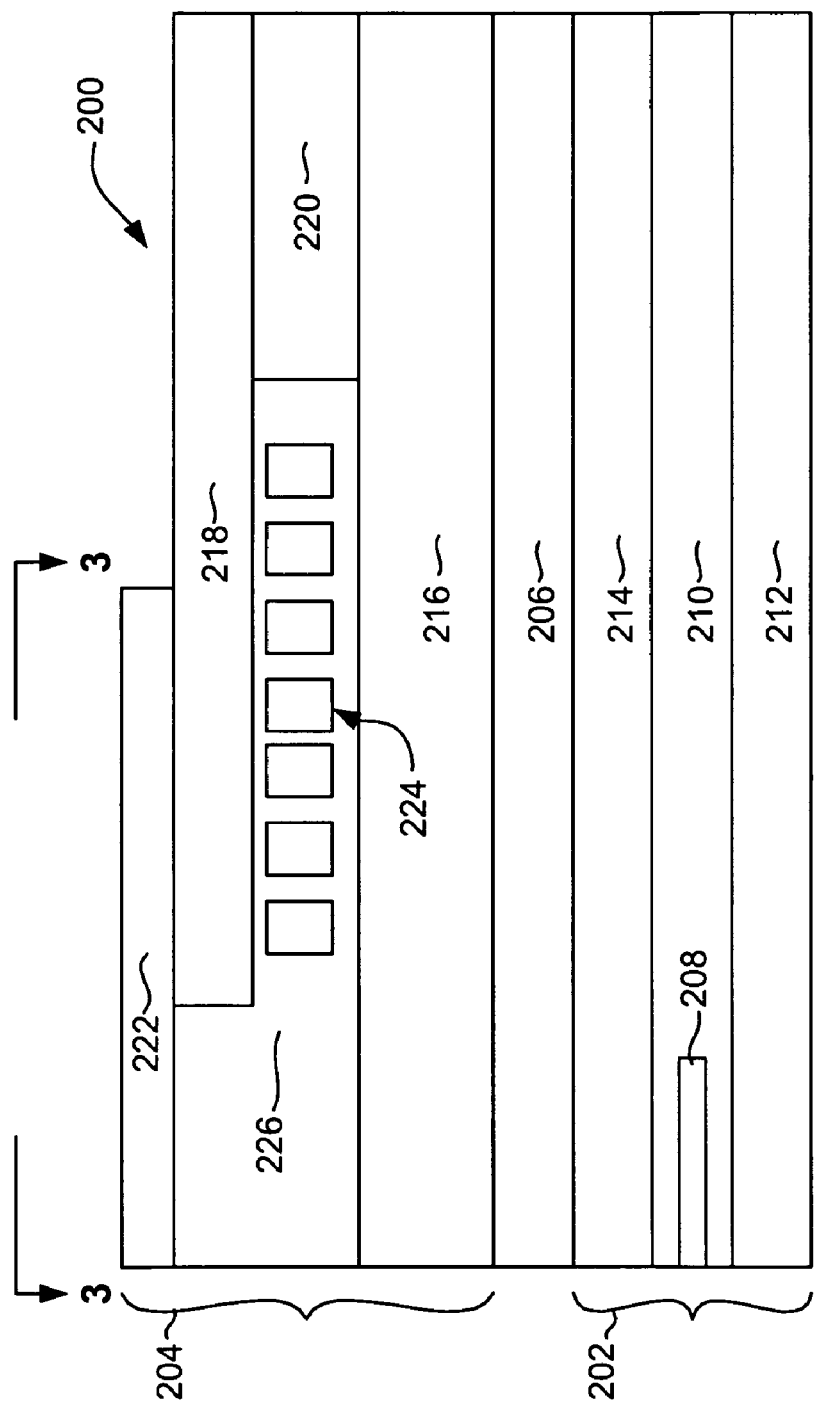
FIG. 2 is a cross sectional view of a perpendicular magnetic write element according to an embodiment of the present invention.

With reference to FIG. 2, a magnetic head 200 includes a read head 202 and a write head 204. The read and write heads 202, 204 may be separated by a non-magnetic, electrically insulating layer 206, which can be, for example, alumina. The read head includes a magnetoresistive element 208 such as a giant magnetoresistive GMR sensor, tunnel valve, etc. The sensor 208 is embedded in a non-magnetic, electrically insulating gap layer 210, which can be for example alumina. The sensor 208 and gap layer 210 are sandwiched between first and second magnetic shield layers 212, 214.

The write head 204 includes a magnetic return pole 216, a magnetic flux guide or shaping layer 218, and a magnetic back gap layer 220 that magnetically connects the return pole with the flux guide layer 218. The return pole 216 back gap 220 and flux guide layer 218 can be constructed of, for example NiFe.

A magnetic write pole 222 is constructed on top of the flux guide layer 218. As can be seen, the flux guide layer 218 does not extend all of the way to the ABS, but the write pole does extend to the ABS. An electrically conductive write coil 224 passes between the return pole and the flux guide 218 and write pole 222. The write coil 224, which may be constructed of, for example Cu and is embedded within a non-magnetic, electrically insulating layer 226 that extend may extend all of the way to the ABS.

The write coil may be constructed of a single layer of copper by plating. Sometimes a double coil design is applied. When current flows through the coil 224, a magnetic field from the coil 224 causes a magnetic flux to flow through the return pole 216 back gap 220, flux guide 218 and write pole 222. This magnetic flux makes a complete path by flowing through an adjacent magnetic medium (not shown). Although not shown in FIG. 2, the cross section of the write pole 222 as viewed from the ABS is much smaller than the cross section of the return pole 216 as viewed from the ABS. Therefore, write field, emitted from the write pole 222 is much more concentrated and stronger than write field returning to the return pole 216. This means that the field from the write pole 222 is sufficiently strong to write to the medium, while the field returning to the return pole 216 is sufficiently week that the signal is not erased by the return pole 216.

Figure 3:
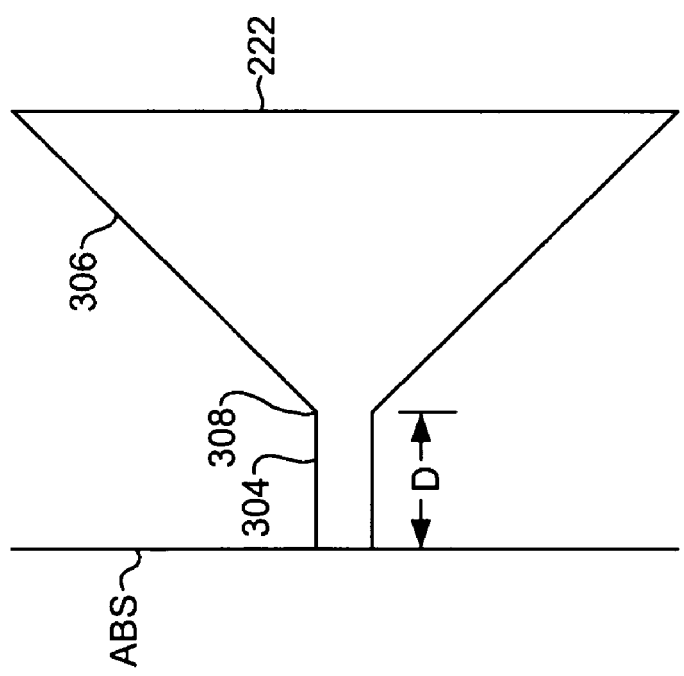
FIG. 3 is a view, taken from line 3-3 of FIG. 2, illustrating a write pole according to an embodiment of the present invention.

With reference now to FIG. 3, a top down view of the write pole 222 shows the top pole 218. As can be seen with reference to FIG. 3, the write pole 222 has a pole tip portion 304 having a narrow, constant cross section, and has a flared portion 306 that flares laterally outward from the pole tip portion 304. The transition between the constant width pole tip portion 304 and the flared portion 306 defines a flare point 308. The flare point is recessed a distance D from the ABS 224. This distance D is an important parameter that affects the performance of the write head 200 (FIG. 2).

Figure 4:
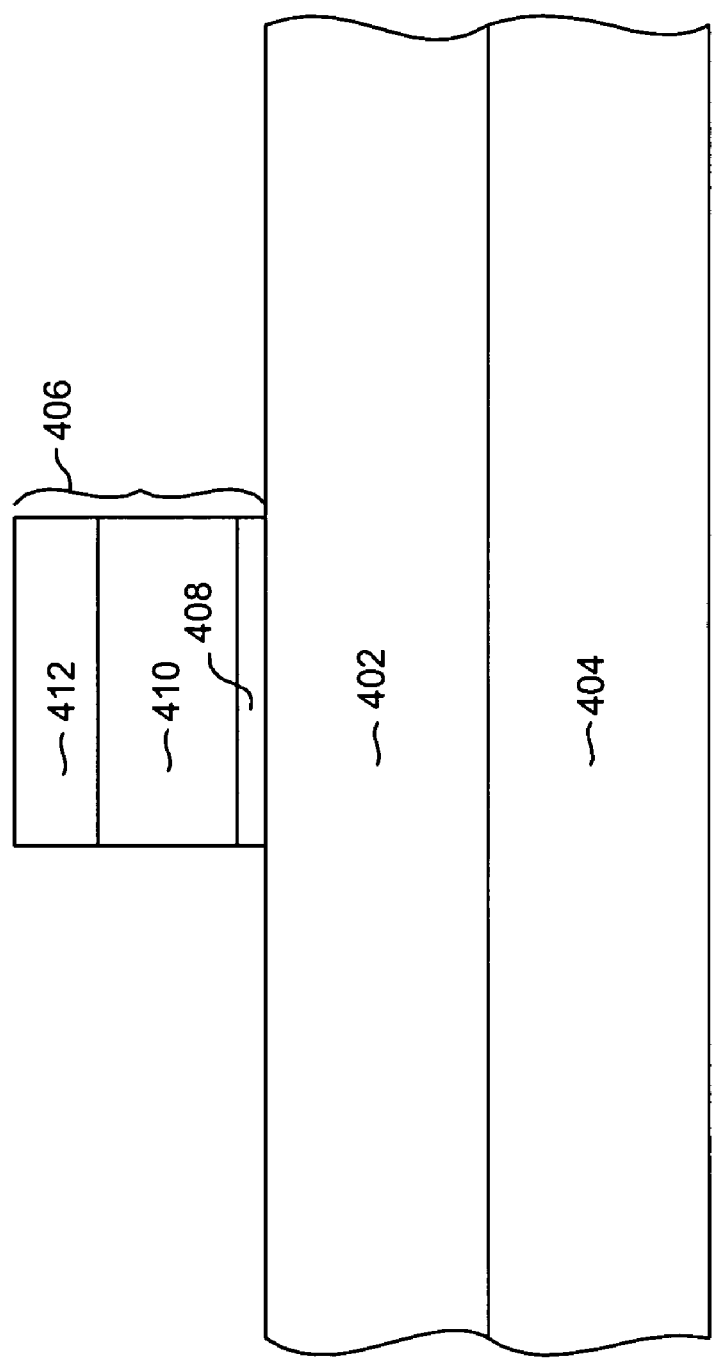
FIGS. 4-6 are ABS views of a write pole according to an embodiment of the invention, shown in various intermediate stages of manufacture in order to illustrate a method of manufacturing a write head according to an embodiment of the invention.

With reference now to FIGS. 4-9, a method for constructing a write pole of a write head is described. With particular reference to FIG. 4, a magnetic write pole material 402 is deposited full film over a substrate 404. As mentioned above, the write pole material 402 can be constructed as a single layer of high Bsat material, but is preferably constructed as multiple layers of magnetic material such as CoFe separated by thin layers of non-magnetic material such as NiCr, Cr, or some other material. The substrate 404 preferably consists of a the insulation layer 226 and a portion of the flux guide 218 as described in FIG. 2 and which have smooth coplanar surfaces.

A mask 406 is constructed over the top of the write pole material layer 402. The mask preferably includes a hard mask 408, an image transfer layer 410, and a photosensitive mask layer 412. The hard mask may be, for example, alumina or silicon dioxide, or could be some other material or combination of materials. The image transfer layer can be a polyimide material such as DURIMIDE®. Other structures for the mask 406 are possible as well. The photosensitive mask layer can be, for example photoresist. The mask 406 can be formed by depositing the layers 408, 410, 412 as full film layers. The photosensitive mask 412 is then photolithographically patterned to define a pole shape. One or more reactive ion etch processes (RIE) can then be performed to transfer the image of the patterned photoresist mask onto the underlying layers 410, 408.

Figure 5:
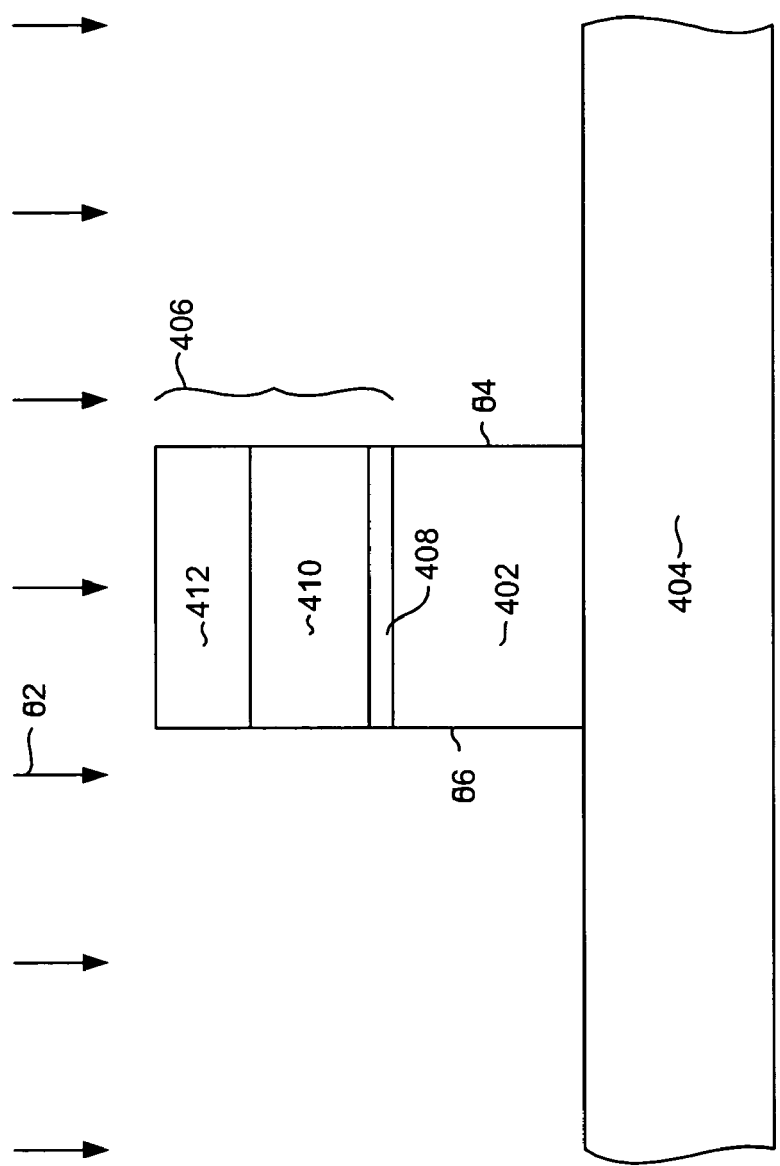

With reference to FIG. 5, a first ion mill 502 is performed to transfer the pattern of the mask 406 onto the underlying write pole material 402 by removing portions of the write pole material 402 that are not covered by the mask 406. As can be seen in FIG. 5, the first ion mill is performed at normal or near normal relative to the surfaces of the layers 402, 404, 408, 410, 412. This vertical (or normal) ion mill 502 results in a write pole 402 having substantially vertical side walls 504, 506.

Figure 6:
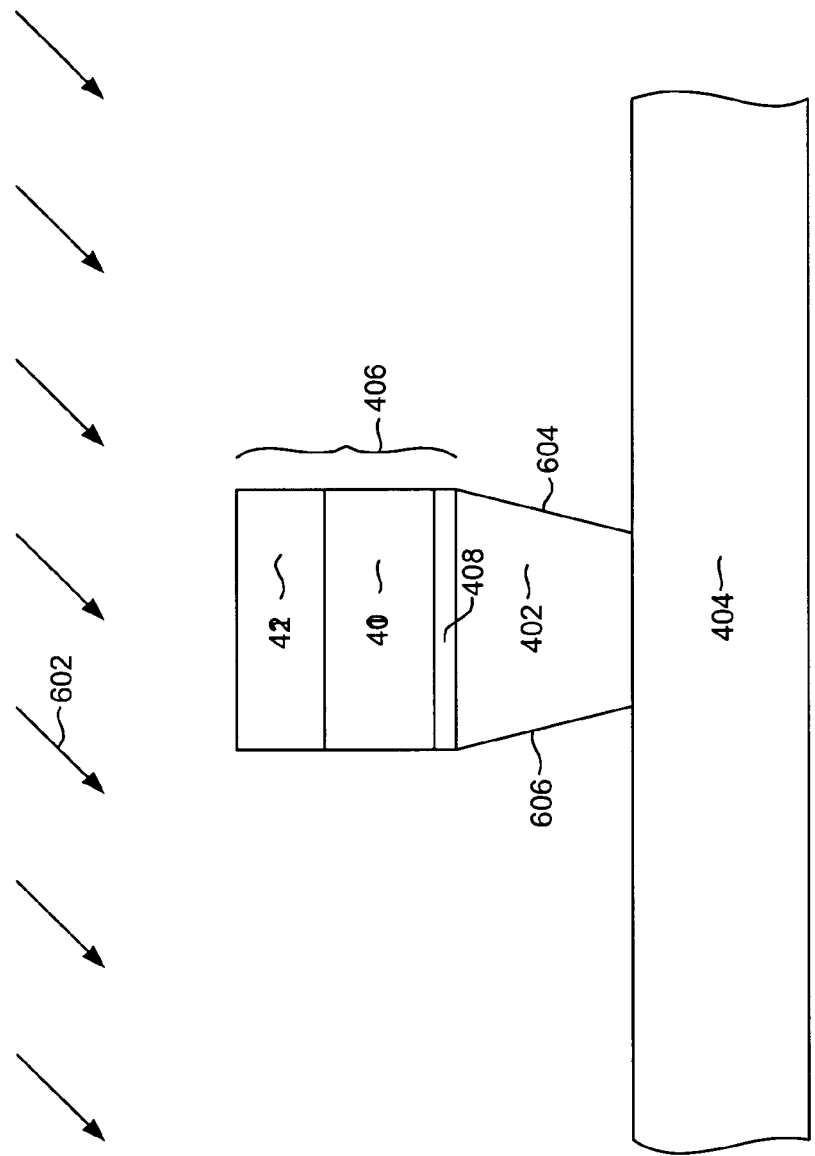

With reference now to FIG. 6, a second ion mill 602 is performed. The second ion mill 602 is performed at an angle relative to normal in order to form the write pole 402 with tapered sides 604, 606 to defining a write pole with a trapezoidal cross section. The desired trapezoidal shape allows the write pole to write to a magnetic medium without causing skew related adjacent track writing when the actuator (not shown) is at its innermost or outermost extensions over the disk surface. The angle of the ion mill 602 can be for example, 20 to 70 degrees relative to normal.

Figure 7:
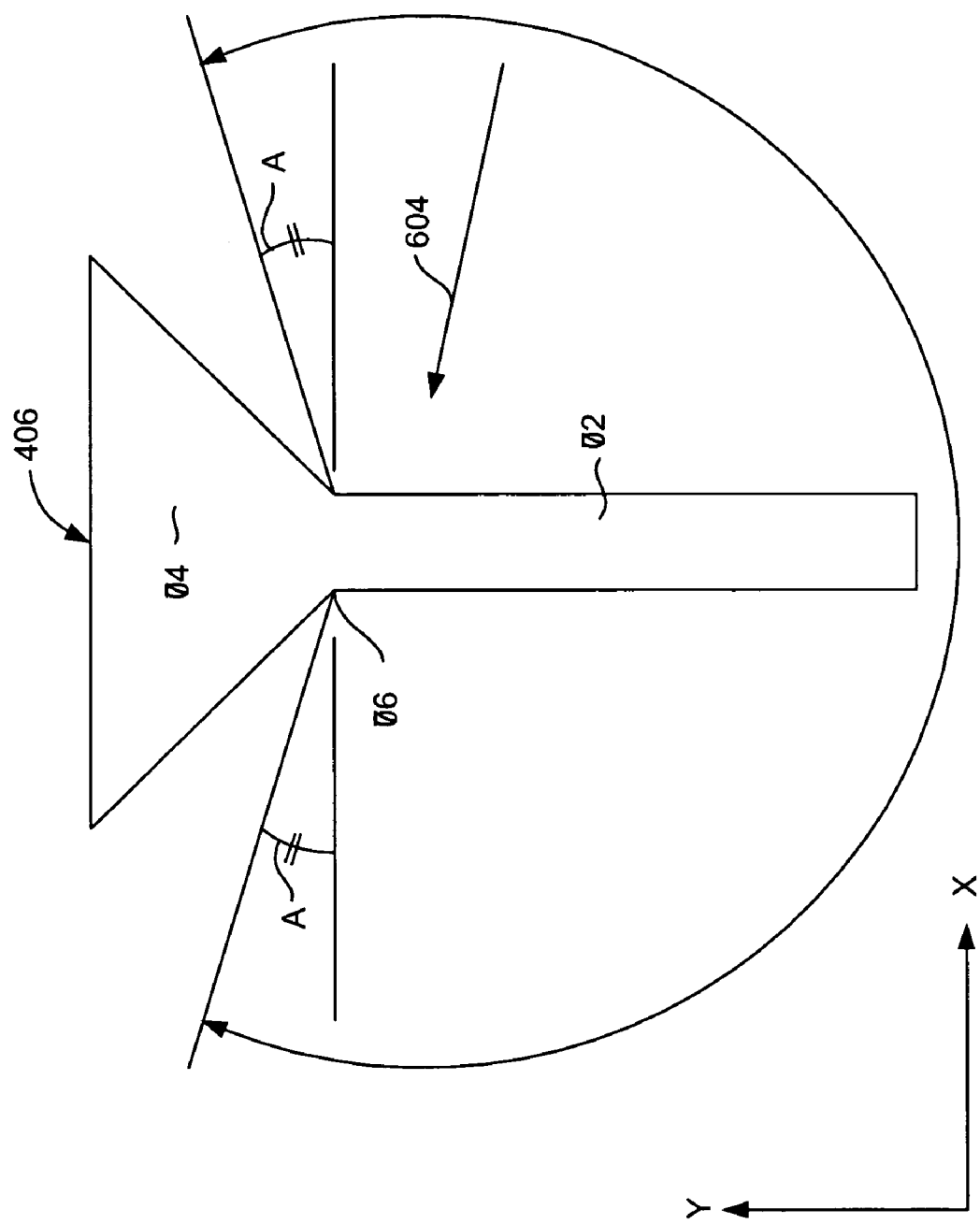
FIG. 7 is a top down view of a write head, illustrating an asymmetrical ion mill process with angle of sweep to construct a perpendicular write pole.

With reference now to FIG. 7, a top down view of the second ion mill 602 can be seen. As can be seen, the mask 406 is constructed in a desired pole shape having a narrow, constant width pole tip portion 702 a flared portion 704 and a flare point 706 at the transition between the pole tip portion and the flare portion. The write pole 402 as shown in FIG. 6 is hidden beneath the mask 406 in the view of FIG. 7. As those skilled in the art will appreciate, the ABS has not yet been formed at this stage of manufacture, and will be formed after the wafer on which the write head is formed has been cut into rows of head at which point a lapping process can be performed to form the ABS. For this reason, the pole tip portion 702 of the mask 406 and underlying write pole (not shown in FIG. 7) is significantly longer than it will be in the finished product.

As can be seen in FIG. 7, the second ion mill 704 is performed in a sweeping fashion. The sweep of the ion mill is performed over a semicircle and does not make a complete circle. Because of shadowing from the flared portion 704, any ion milling coming from behind the flare would cause undesired and inconsistent milling results in the write head 402. The sweep preferably extends a total sweep of about (180+ 2A) degrees, stopping at a point of about A degrees above the x axis, depending on the flare angle design on the pole. The angle A can be, for example 5 to 30 degrees depending on design requirements. Therefore, although it can be seen that the ion mill sweep is symmetrical about the y axis (in the x direction) it is asymmetrical in about the x axis (in the y direction). A problem that arises as a result of this asymmetrical ion mill sweep is that the ion milling causes a recession of the write pole.

This recession, being dependent upon the strength and duration of ion milling is difficult to control. It is important that the location of the flare point 706 be carefully controlled. Preferably the location of the flare point is controlled relative to the back edge or stripe height of the underlying magnetoresistive sensor (not shown in FIG. 7). The use of a reference feature such as a round or rectangular feature does not provide an accurate representation of the location of the flare point relative to the underlying sensor. This is because the reference feature will be affected by the asymmetrical ion mill in the same way that the write pole is. In other words, such a reference feature would be recessing in the y axis about as much as the write pole does and the center of it will change in y after mill.

Figure 8:
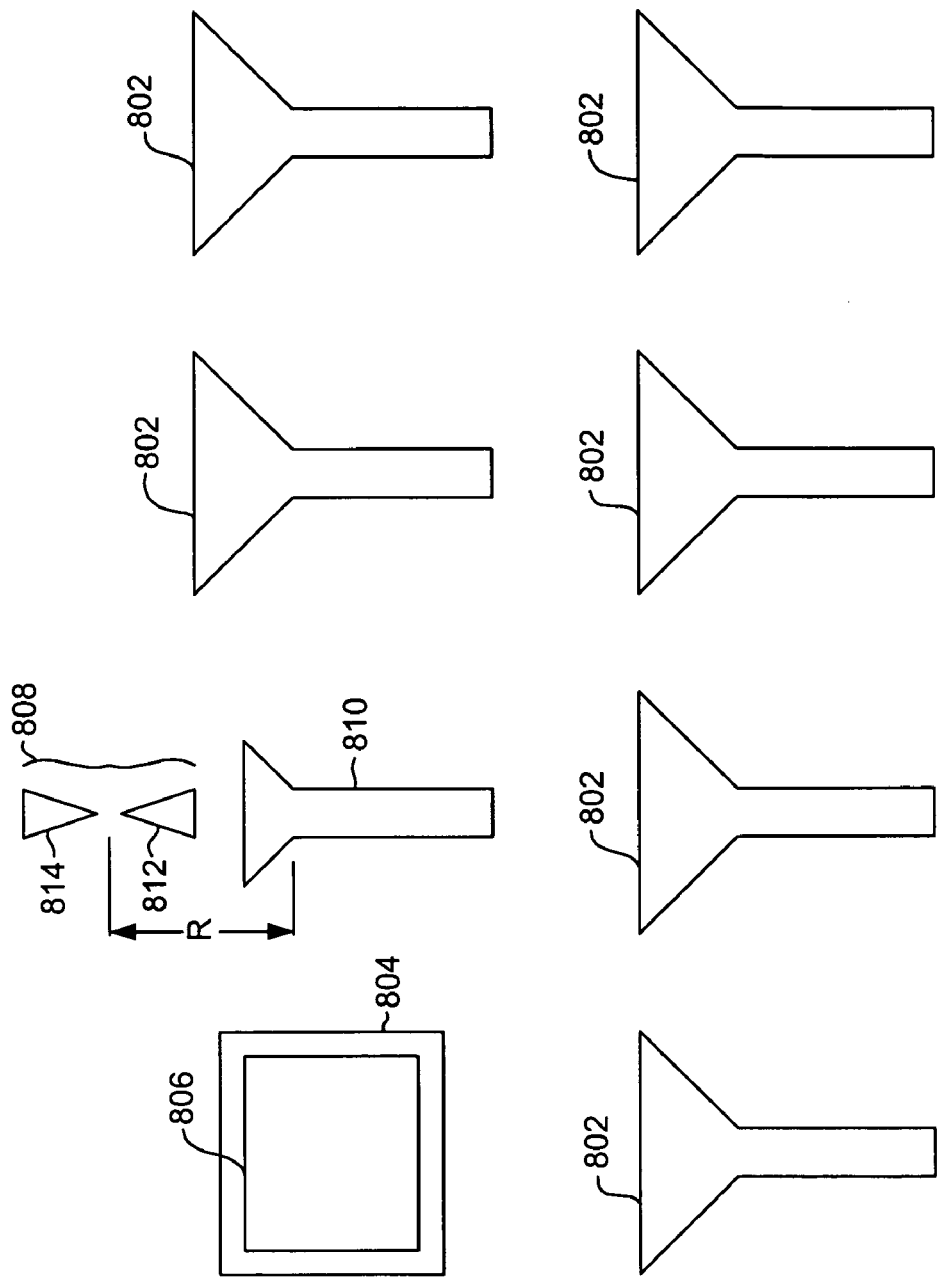
FIG. 8 is a view of a portion of a wafer illustrating a reference feature according to the present invention.

FIG. 8 illustrates a method for accurately determining the location of the flare point 706 of the mask structure 406 and write pole (hidden behind the mask 406 in FIG. 7) and reference it to the rear edge of the read sensor through overlay metrology. With reference to FIG. 8, a small portion of a wafer is shown having a plurality of write pole features 802. The write pole features 802 include the mask structure 406 and a write pole 402 hidden beneath the mask 406 as described above with reference to FIGS. 6 and 7. Each write pole feature 802 has a flare point 706. It should be pointed out that, although several pole structures 802 are shown in FIG. 8, this is because only a small portion of the wafer is shown. A wafer would actually contain thousands of such features 802.

With continued reference to FIG. 8, the photo process used to define the write pole features 802 is aligned with previous, underlying photo steps by a reference overlay box opening 804 that exposes an underlying reference overlay feature 806. As those skilled in the art will appreciate, the deposition, photo and milling steps used to define the write pole features 802 are performed as many as 10 photo steps above that used to define the back edge (stripe height) of the underlying magnetoresistive sensor 208 (FIG. 2). By aligning every photo step to a single reference feature, all of the photo steps (including the one used to define the write pole feature 802) can be accurately aligned with one another.

Although the photo step used to define the write pole feature 802 can be accurately aligned with the previously formed sensor 208, the problem remains that the asymmetrical ion milling will cause the location of the flare point 706 to move. Therefore a means for determining the location of the flare point 706 and amount of recession independent of the reference feature 804 is needed. To that end, a reference feature pair 808 having a novel shape is provided. The reference feature may be formed behind a dummy write pole 810 feature in order to further facilitate the measurement of the recession. The dummy write pole feature 810 may have the same exact shape as the write pole features, or may be slightly modified to save wafer real estate. As can be seen with reference to FIG. 8, the reference feature pair 808 is constructed as two relatively narrow features 812, 814. The features 812, 814 are preferably in the form of two isosceles triangles. The amount of recession of the write pole is determined by measuring a distance R, defined from the center of the two apex points to the flare point of the dummy feature, which can be measured during or after ion milling. As will become clear below, the center point between the two features 812, 814 remains virtually unaffected by the asymmetrical ion mill because the apex angles are designed to be small so the isosceles pairs mimic the thin line features. After R is identified, the final goal of estimating the flare distance to the ABS is obtained by the overlay information measured through the overlay box pair 804 and 806 since the lapping of a finished head is referenced with the location of the read sensor.

Figure 9:
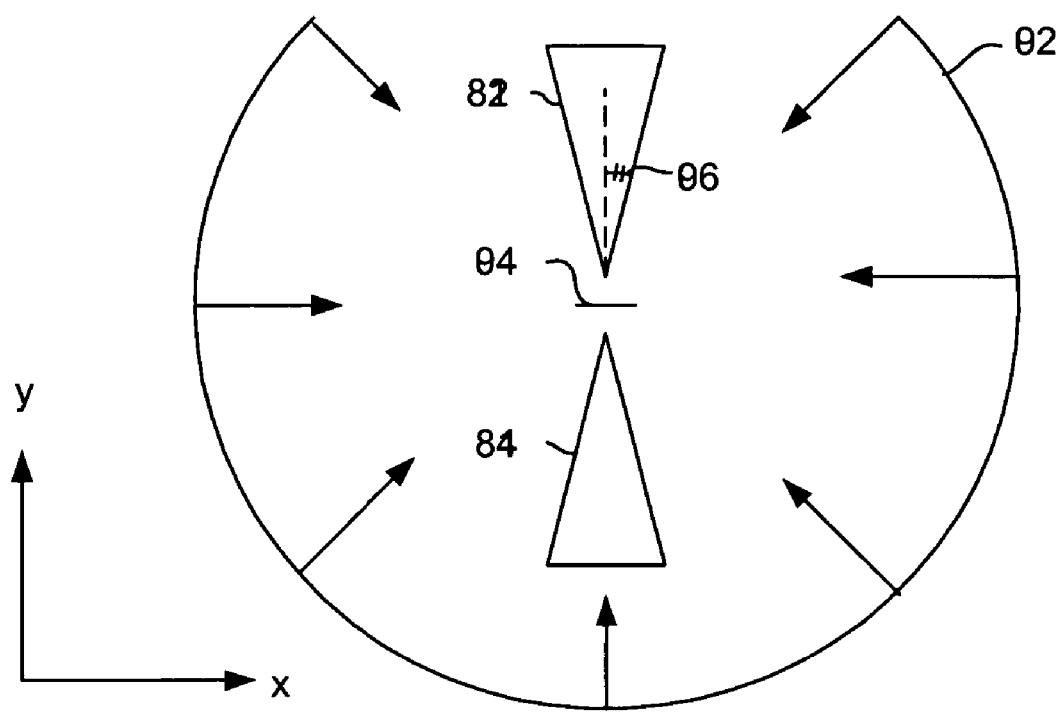
FIG. 9 is an enlarged view of the reference feature pair shown in FIG. 8, illustrating the affect of ion mill asymmetry on the features.

FIG. 9 shows the reference features 812, 814 in greater detail. Ion milling is a directional process, wherein the amount of material removed is strongly related to the angle of the surface with respect to the angle of the ion mill. As can be seen in FIG. 9, an ion mill 902 conducted in a sweeping fashion as described above will strike the reference feature 812, 814 at various angles. It can also be seen that while the milling is symmetrical about the y axis it is asymmetrical about the x axis (in the y direction) as mentioned above. However, because the sides of the triangular features are very steep (ie. they define a small angle with respect to the y axis), the material removal is much more strongly affected by ion milling coming from the sides (in the x direction) than from the top or bottom (ie. in the y direction). For this reason, the asymmetrical component of the ion mill (in the y direction) has negligible effect on the material removal from the sides of the features 812, 814 as compared with the material removal from the symmetrical portion of the ion mill (i.e. from the sides). Therefore, the midpoint 904 between the two features 812, 814 does not move during the asymmetrical ion mill.

To better illustrate this effect, consider that the features 812, 814 were infinitely narrow in the x direction and long in the y direction. All of the surface area would be facing the sides so as to be affected by the horizontal component of the ion mill 902. There would be no material at the top or bottom to be removed by the vertical component. It should be pointed out that the terms vertical and horizontal refer to their relation to the x and y planes not to the actual horizon. In that case the features would be completely unaffected by the asymmetry of the ion mill and would be removed at the same rate.

Of course an infinitely narrow feature would not be practical or process friendly, and even if a very narrow rectangular feature were constructed it would be difficult to see and would be immediately milled completely away. The triangular features 812, 814 of the present invention provide a practical feature that can be easily formed during photolithography; it can easily be seen and can withstand the ion milling, while still providing the benefits of a very narrow feature such as described above. The features 812, 814 remain unaffected by the asymmetry of the ion mill. The center point between the isosceles apexes remains constant after ion mill.

In order to function effectively as reference features, the sides of the features preferably define a relatively narrow angle 906 relative to the y axis. This isosceles apex angle could be small to low double-digit degrees. More specifically, the angle 906 can be less than or equal to ten degrees and is more preferably less than 5 degrees. The apexes of each of the triangular features 412, 414 will each move the same amount in the y direction, but in opposite directions during the ion mill. An algorithm can be employed to find the tips through line fitting of both isosceles sides and interception. Then the centerpoint 904 will be defined for flare point measurement reference.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for manufacturing a magnetic write head, comprising:
   providing a wafer;
   depositing material on the wafer;
   performing a photolithographic patterning step, the patterning step defining a plurality of features on the material and also defining first and second reference features on the material, the first and second reference features being separated by a distance measured in a y direction;
   performing a sweeping ion mill to the plurality of features and the first and second reference features formed on the material, the sweeping ion mill being symmetrical in an x direction and asymmetrical in the y direction; and
   measuring a distance between one of the plurality of features and a midpoint between the reference features.

2. The method as in claim 1 wherein the first and second reference features each have a width measured along the x direction and a length measured in the y direction, and wherein the width is smaller than the length.

3. The method as in claim 1 wherein the first and second reference features are isosceles triangles each having an apex that faces an apex of the other reference feature.

4. The method as in claim 1 wherein the first and second reference features are isosceles triangles each having an apex that faces an apex of the other reference feature, the triangles each having first and second sides that define an angle less than or equal to 10 degrees with respect to the y direction.

5. The method as in claim 1 wherein the first and second reference features are isosceles triangles each having an apex that faces the apex of the other reference feature, the triangles each having first and second sides that define an angle less than 5 degrees with respect to the y axis.

6. A method for manufacturing a magnetic write head, comprising:
provided a wafer;
depositing a magnetic material;
depositing a photosensitive mask material;
photolithographically patterning the photosensitive mask material to define a dummy write pole feature having a flare point, and first and second reference features each being separated by a distance measured in a y direction and defining a midpoint between the first and second reference features;
performing a sweeping ion mill to the dummy write pole feature and the first and second reference features, the sweeping ion mill being asymmetrical in the y direction and symmetrical in an x direction that is perpendicular to the y direction; and
measuring a distance between the flare point of the dummy write pole feature and the midpoint between the first and second reference features.

7. The method as in claim 6 further comprising terminating the sweeping ion mill when the distance between the flare point in the dummy write pole feature and the midpoint between the first and second reference features reaches a predetermined value.

8. The method as in claim 6 wherein the measuring the distance between the flare point in the write pole feature and the midpoint between the first and second reference features is performed at least partially simultaneously with said sweeping ion mill, the method further comprising terminating the sweeping ion mill when the distance between the flare point in the dummy write pole feature and the midpoint between the first and second reference features reaches a predetermined value.

9. The method as in claim 6 wherein the first and second reference features are narrower in the x direction than in the y direction.

10. The method as in claim 6 wherein the first and second reference features have first and second sides that define an angle of no greater than 10 degrees with respect to the y direction.

11. The method as in claim 6 wherein the first and second reference features each define a triangle having first and second sides that define an angle of no greater than 10 degrees with respect to the with respect to the y direction.

12. The method as in claim 6 wherein the first and second reference features each define an isosceles triangle each having an apex that faces the other reference feature.

13. The method as in claim 6 wherein the first and second reference features each define an isosceles triangle each having an apex that faces the other reference feature and each having first and second sides that define an angle no greater than ten degrees with respect to the y direction.

14. The method as in claim 6 wherein the photolithographic patterning further defines a plurality of write pole features.

15. The method as in claim 6 wherein the photolithographic patterning also defines a write pole, the write pole being symmetrical about the y axis.

16. The as in claim 5 wherein the first and second reference features each define a triangle having first and second sides that define an angle of less than 5 degrees with respect to the y axis.

17. A method for measuring ion mill induced recession, the method comprising:
providing a wafer, the wafer having x and y dimensions, the x dimension being measured in an x axis, and the y dimension being measured in a y axis that is perpendicular to the x axis;
depositing a material on the wafer;
forming first, second and third features on the material, the second and third features being reference features, the second and third features being separated by a distance measured in the y dimension and having a midpoint therebetween;
performing a sweeping ion mill to the first, second and third features formed on the material, the sweeping ion mill being symmetrical in the x direction and asymmetrical in the y direction; and
measuring the distance between the first feature and the midpoint between the second and third features.

18. The method as in claim 17, wherein the second and third features are both symmetrical about the y axis.

19. The method as in claim 17 wherein the second and third features each have a width measured along the x dimension and a length measured alone the y dimension, and where in the width is smaller than the length.

20. The method as in claim 17 wherein each of the second and third reference features is configured as a triangle configured with first and second sides that define an angle of ten degrees or less with respect to the y axis.

21. The method as in claim 17 wherein each of the second and third reference features is triangle configured with an acute corner, and wherein the acute corner of the second reference feature faces the acute corner of the third reference feature.

22. The method as in claim 17 wherein each of the second and third features is configured as an isosceles triangle configured with an apex, and wherein the apexes of the second and third features face one another.

23. The method as in claim 17 further comprising a fourth feature, and wherein the first feature is a dummy feature that that has a recession rate that is similar to the fourth feature formed on the wafer.

24. The method as in claim 17 wherein the first feature is a dummy feature that has recession rate that is similar to a write pole formed on the wafer.

25. The method as in claim 17 wherein the first feature is a write pole.

* * * * *